UNITED STATES PATENT OFFICE.

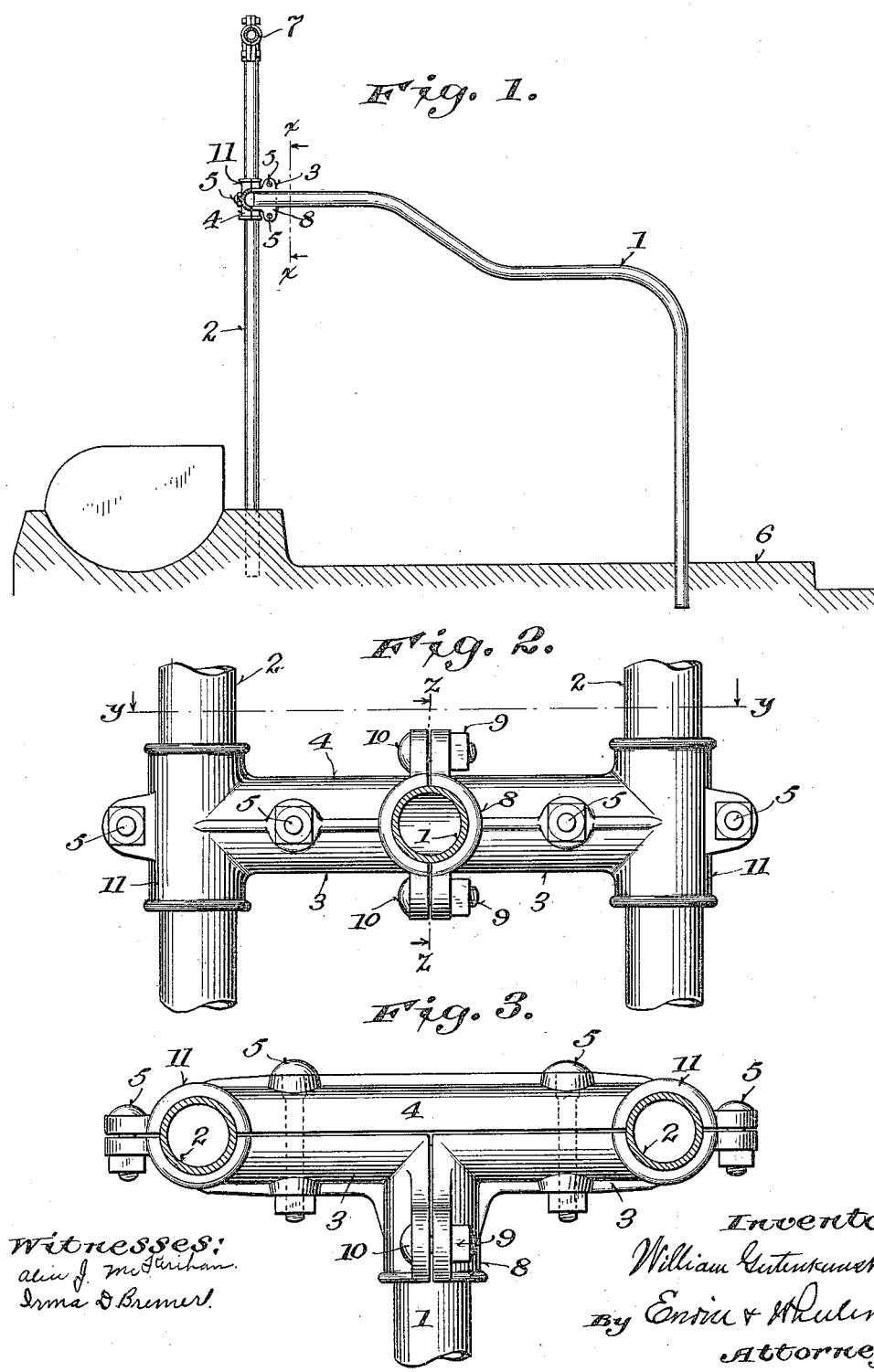

WILLIAM GUTENKUNST, OF MILWAUKEE, WISCONSIN.

STANCHION-SUPPORTING FRAME.

1,154,625.  Specification of Letters Patent.  Patented Sept. 28, 1915.

Application filed March 22, 1915. Serial No. 16,026.

*To all whom it may concern:*

Be it known that I, WILLIAM GUTENKUNST, a citizen of the United States, residing at the city of Milwaukee, county of Milwaukee, and State of Wisconsin, have invented new and useful Improvements in Stanchion-Supporting Frames, of which the following is a specification.

My invention relates to improvements in means for connecting the upper front end of a division member of a stanchion supporting frame with two of the vertical members of such frame. Heretofore it has been common to form such connections through a plurality of ordinary pipe couplings, nipples, T's, etc., in which case it becomes necessary to form each of the vertical standards of two separate pieces and to connect them together with screw threaded couplings or T's, which T's are connected together by a plurality of nipples.

The object of my present invention is to provide means for connecting such division member with the vertical standards of the stanchion supporting frame by a plurality of cast metal clamping members, whereby threaded pipe couplings, T's, etc., heretofore used are dispensed with.

My invention is further explained by reference to the accompanying drawings, in which—

Figure 1 is a section drawn on line $z, z$ of Fig. 2. Fig. 2 is an enlarged vertical section drawn on line $x, x$ of Fig. 1, and Fig. 3 is a horizontal section drawn on line $y, y$ of Fig. 2.

Like parts are identified by the same reference numerals throughout the several views.

1 is a division member which is connected at its upper front end with the two vertical standards 2, 2 by a plurality of connecting members 3, 3, 4 and a plurality of clamping bolts 5. The lower rear end of the division member 1 is adapted to be embedded in a cement or other floor 6 in the ordinary manner, and the upper end of the standards 2 are connected together by a transverse member 7 in the ordinary manner. The members 3, 3 and 4 are rigidly secured to the vertical standards 2 by said bolts 5. When this is done the division member 1 is inserted in the nipple 8 when it is securely clamped therein by turning down the nuts 9 on the bolts 10, whereby the two opposing sides of the nipple 8 are drawn firmly against the periphery of the division member 1, whereby such division member is securely retained in place. By such arrangement it is obvious that no screw threads are necessary for connecting the tubular members 11 with the standards 2, or for connecting the division member 1 with the nipple 8.

Having thus described my invention what I claim as new and desire to secure by Letters Patent, is:—

1. In a device for connecting the upper front end of a division member of a stanchion supporting frame with two vertical members of such frame, consisting in the combination with such division member and a vertical member, of a clamping member provided near its respective ends with a semi-circular sleeve adapted to partially surround one side of both of said vertical members, two additional clamping members each provided at one end with semi-circular sleeves adapted to partially surround the opposite sides of said vertical members, each of said additional clamping members being provided at their opposite ends with semi-circular sleeves, which taken together form a tubular nipple for the reception of the upper front end of said division member, and means for securing all of said clamping members together and in rigid contact with said frame members.

2. In a device for connecting the upper front end of a division member of a stanchion supporting frame with two vertical members of such frame, consisting in the combination with such division member and a vertical member, of a clamping member provided near its respective ends with a semi-circular sleeve adapted to partially surround one side of both of said vertical members, two additional clamping members each provided at one end with semi-circular sleeves adapted to partially surround the opposite sides of said vertical members, each of said additional clamping members being provided at their opposite ends with semi-circular sleeves, which taken together form a tubular nipple for the reception of the upper front end of said division member, a plurality of bolts and nuts for securing all of said clamping members together and in rigid contact with said frame members.

3. In a device for connecting the upper front end of a division member of a stanchion supporting frame with two vertical members of such frame, consisting in the combination with such division and a vertical member, of a clamping member provided at its ends and at intermediate points between its ends with a plurality of bolt holes, and near its respective ends with a semi-circular sleeve adapted to partially surround one side of both of said vertical members, two additional clamping members each provided with a plurality of bolt holes registering with the holes in the opposite clamping member, and at one end with semi-circular sleeves adapted to partially surround the opposite sides of said vertical frame members, each of said additional clamping members being provided at their opposite ends with semi-circular sleeves, which taken together form a tubular nipple for the reception of the upper front end of said division member, and a plurality of bolts and nuts for securing all of said clamping members together and in rigid contact with said frame members.

In testimony whereof I affix my signature in the presence of two witnesses.

WILLIAM GUTENKUNST.

Witnesses:
ALICE J. McKERIHAN,
IRMA D. BREMER.

Copies of this patent may be obtained for five cents each, by addressing the "Commissioner of Patents, Washington, D. C."